US008550335B2

(12) United States Patent
Samek et al.

(10) Patent No.: US 8,550,335 B2
(45) Date of Patent: Oct. 8, 2013

(54) ENCODED INFORMATION READING TERMINAL IN COMMUNICATION WITH PERIPHERAL POINT-OF-SALE DEVICES

(75) Inventors: Justin Samek, Voorhees, NJ (US); Mark Hernandez, Bridgeton, NJ (US)

(73) Assignee: Honeywell International, Inc., Fort Mill, SC (US)

( * ) Notice: Subject to any disclaimer, the term of this patent is extended or adjusted under 35 U.S.C. 154(b) by 2 days.

(21) Appl. No.: 13/416,113

(22) Filed: Mar. 9, 2012

(65) Prior Publication Data

US 2013/0233915 A1 Sep. 12, 2013

(51) Int. Cl.
*G06F 17/00* (2006.01)
*G06K 7/10* (2006.01)

(52) U.S. Cl.
USPC .................................... 235/375; 235/472.01

(58) Field of Classification Search
USPC ........................................ 235/375, 472.01
See application file for complete search history.

(56) References Cited

U.S. PATENT DOCUMENTS

| | | | | |
|---|---|---|---|---|
| 5,500,890 | A | 3/1996 | Rogge et al. | |
| 6,785,845 | B2 | 8/2004 | Venkataraman | |
| 6,837,436 | B2 | 1/2005 | Swartz et al. | |
| 7,487,260 | B2 | 2/2009 | Dorai et al. | |
| 7,568,015 | B2 | 7/2009 | Wang et al. | |
| 7,715,334 | B2 | 5/2010 | Harsch | |
| 7,813,822 | B1 | 10/2010 | Hoffberg | |
| 7,912,914 | B2 | 3/2011 | Coutts et al. | |
| 7,962,655 | B2 | 6/2011 | Birger et al. | |
| 7,974,714 | B2 | 7/2011 | Hoffberg | |
| 2005/0040230 | A1 | 2/2005 | Swartz et al. | |
| 2005/0060246 | A1 | 3/2005 | Lastinger et al. | |
| 2005/0120096 | A1 * | 6/2005 | Rekimoto et al. | 709/220 |
| 2005/0268003 | A1 | 12/2005 | Wang et al. | |
| 2007/0053513 | A1 | 3/2007 | Hoffberg | |
| 2007/0210155 | A1 | 9/2007 | Swartz et al. | |
| 2007/0226318 | A1 | 9/2007 | Rydberg et al. | |
| 2009/0017810 | A1 | 1/2009 | Harsch | |
| 2011/0289184 | A1 | 11/2011 | Wolinsky et al. | |
| 2012/0011008 | A1 | 1/2012 | Sivapathasundram et al. | |

* cited by examiner

*Primary Examiner* — Jamara Franklin
(74) *Attorney, Agent, or Firm* — Heslin Rothenberg Farley & Mesiti P.C.

(57) ABSTRACT

An encoded information reading (EIR) terminal can comprise a processor, a memory, and at least one EIR device provided by a bar code reading device, an RFID reading device, an NFC reading device, or a magnetic card reading device. The EIR device can be configured to output raw message data containing an encoded message and/or output decoded message data corresponding to an encoded message. The EIR terminal can further comprise at least one communication interface, a display provided by a built-in display and/or an external display, and a user input device provided by a built-in keyboard and/or an external keyboard. The EIR terminal can be configured to transmit the raw message data and/or the decoded message data to an external computer.

20 Claims, 5 Drawing Sheets

ENCODED INFORMATION READING TERMINAL IN COMMUNICATION WITH PERIPHERAL POINT-OF-SALE DEVICES

FIELD OF THE INVENTION

The invention is generally related to encoded information reading (EIR) terminals and is specifically related to an EIR terminal in communication with one or more peripheral point-of-sale (POS) devices.

BACKGROUND OF THE INVENTION

A retail checkout lane is typically equipped with a personal computer (PC) running a checkout application and connected to several peripheral devices including encoded information reading (EIR) terminals, weigh scales, check readers, printers, etc.

SUMMARY OF THE INVENTION

In one embodiment, there is provided an encoded information reading (EIR) terminal comprising a processor, a memory, and at least one EIR device provided by a bar code reading device, an RFID reading device, an NFC reading device, or a magnetic card reading device. The EIR device can be configured to output raw message data containing an encoded message and/or output decoded message data corresponding to an encoded message. The EIR terminal can further comprise at least one communication interface, a display provided by a built-in display and/or an external display, and a user input device provided by a built-in keyboard and/or an external keyboard. The EIR terminal can be configured to transmit the raw message data and/or the decoded message data to an external computer. The EIR terminal can be further configured to communicate to one or more external peripheral devices. The EIR terminal can be further configured to route messages from the peripheral devices to an external computer and/or to route messages from the external computer to the peripheral devices. The EIR terminal can be further configured to aggregate two or more messages received from a peripheral device and forward an aggregated message to the external computer, and/or to aggregate two or more messages received from the external computer and forward an aggregated message to a peripheral device.

In one embodiment, the EIR terminal can be configured to control the peripheral devices.

In one embodiment, a first EIR device can be provided by an RFID reading device, and a second EIR device can be provided by a bar code reading device, an NFC reading device, or a magnetic card reading device.

In one embodiment, the peripheral device can be provided by a cash register, an electronic payment terminal, a PIN entry keypad, a printer, a weigh scale, a check reader, an electronic article surveillance (EAS) controller, a personal communication device, an imaging device, a biometric identifier device, an object identification device, an encryption module, or an auxiliary EIR device.

In one embodiment, the EIR terminal can be configured to communicate to at least one peripheral device via a communication interface capable of delivering electric power to the peripheral device.

In one embodiment, the EIR terminal can be configured to route at least one message between a peripheral device and the external computer without modifying a payload of said at least one message.

In one embodiment, the EIR terminal can be configured to display at least one message received from the external computer using the built-in display and/or the external display.

In one embodiment, the EIR terminal can be configured to transmit to the computer one or more characters received via the user input device.

In one embodiment, the EIR terminal can be configured to broadcast at least one message to two or more peripheral devices.

In one embodiment, the EIR terminal can be configured to act as an application-level protocol proxy for at least one peripheral device.

In one embodiment, the EIR terminal can be configured to communicate to the external computer using TCP/IP protocol.

In one embodiment, the EIR terminal can be configured to communicate to at least one peripheral device over a wired communication interface provided by an Ethernet interface, a parallel interface, a serial interface, a Thunderbolt interface, a USB interface, an optical media interface, or a PCMCIA interface.

In one embodiment, the EIR terminal can be configured to communicate to at least one peripheral device over a wireless communication interface configured to support a communication protocol compliant with IEEE 802.1x, Bluetooth, GSM, GPRS, EDGE, HSPA, CDMA, EV-DO TDMA, or UMTS standard.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
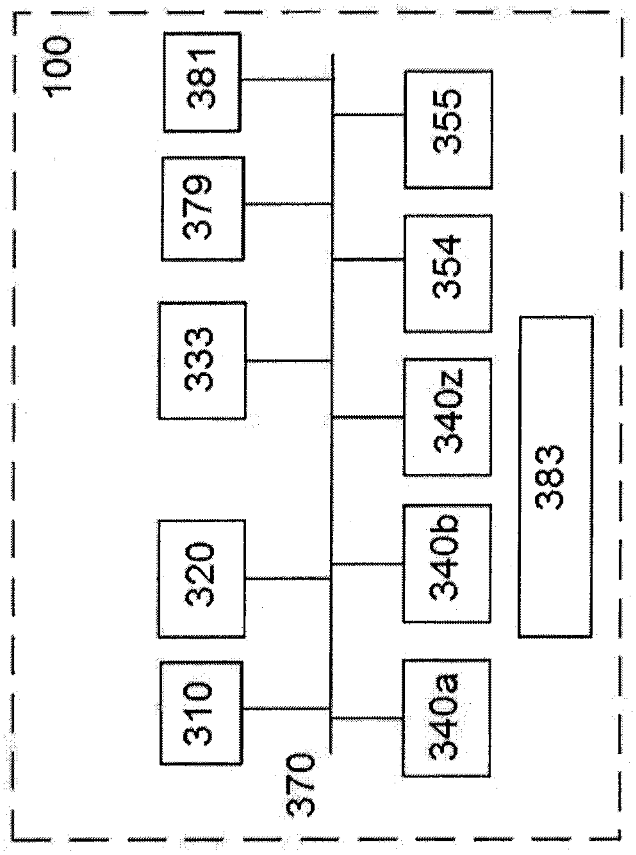
FIG. 1 depicts component-level layout of the EIR terminal.

A retail checkout lane can be equipped with a personal computer (PC)-based checkout station including a PC running a checkout application. The PC can be connected to a number of peripherals including, for example, a cash register, an electronic payment terminal, a PIN entry keypad, a printer, a weigh scale, a check reader, an electronic article surveillance (EAS) controller, a personal communication device (e.g., a two-way voice communication device), an imaging device (internal or external), a biometric identifier device, an object identification device, an encryption module, or an auxiliary EIR device. In order to reduce the costs associated with acquiring and maintaining a checkout station, the checkout application can be moved to a store server or a remote server thus allowing an encoded information reading (EIR) terminal become a host routing messages between the server and several peripheral devices, including weight scales, card readers, printers, etc., thus eliminating the PC from the checkout station.

In one embodiment, there is provided an encoded information reading (EIR) terminal comprising a processor, a memory, and at least one EIR device. The EIR device can be provided by a bar code reading device, an RFID reading device, a near field communication (NFC) reading device, or a magnetic card reading device. The EIR terminal can be further configured to communicate to one or more peripheral devices, including, for example, a display, a cash register, an electronic payment terminal, a PIN entry keypad, a receipt printer, a weigh scale, a check reader, an electronic article surveillance (EAS) controller, a personal communication device (e.g., a two-way voice communication device), an imaging device (internal or external), a biometric identifier device, an object identification device, an encryption module, or an auxiliary EIR device. The EIR terminal can be further configured to route messages between one or more peripheral devices and an external computer running a checkout application (e.g., a store server connected to the store LAN or a remote server reachable via a VPN or the Internet). The EIR terminal can be further configured to control one or more of the above listed peripheral devices.

A "computer" herein shall refer to a programmable device for data processing, including a central processing unit (CPU), a memory, and at least one communication interface. For example, in one embodiment, a computer can be provided by an Intel-based server running Linux operating system. In another embodiment, a computer can be provided by a virtual server, i.e., an isolated instance of a guest operating system running within a host operating system.

The EIR terminal can be further configured to display messages received from the external computer using a built-in or an external display. The display can be provided, e.g., by a color or monochrome display. In another aspect, the display can be provided, e.g., by an LCD display or by a CRT display. A skilled artisan would appreciate the fact that other types of displays are within the scope of this disclosure. The EIR terminal can be further configured to transmit to the external computer the characters received via a built-in or an external keyboard. In one embodiment, the EIR terminal can be configured to provide, through one or more peripheral devices including a display and a keyboard, the user interface for a checkout application executed by the external computer.

Component-level diagram of one embodiment of an EIR terminal is now being described with references to FIG. 1. The EIR terminal 100 can comprise at least one microprocessor 310 and a memory 320, both coupled to a system bus 370. The microprocessor 310 can be provided by a general purpose microprocessor, by a specialized microprocessor (e.g., an ASIC), or by a System on a chip (SoC). In one embodiment, the EIR terminal 100 can comprise a single microprocessor which can be referred to as a central processing unit (CPU). In another embodiment, the EIR terminal 100 can comprise two or more microprocessors, for example a CPU providing some or most of the EIR terminal functionality and a specialized microprocessor performing some specific functionality. A skilled artisan would appreciate the fact that different schemes of processing tasks distribution among the two or more microprocessors are within the scope of this disclosure.

As noted herein supra, the EIR terminal 100 can further comprise one at least one EIR device 333. The EIR device can be provided by a bar code reading device, an RFID reading device, a near field communication (NFC) reading device, or a magnetic card reading device. The EIR device can be configured to read an encoded message and to output raw message data containing the encoded message. The RFID reading device can be further configured to output decoded message data containing, for example, identifiers of the items to which the bar code labels or RFID tags are attached. As used herein, "message" is intended to denote a character string comprising alphanumeric and/or non-alphanumeric characters. An encoded message can be used to convey information, such as identification of the source and the model of an item, for example, in a UPC code. The EIR terminal can be configured to transmit raw message data and/or decoded message data to an external computer (e.g., a store server or a remote server).

The EIR terminal 100 can further comprise one or more communication interfaces 340*a*-340*z* for communicating to one or more peripheral devices and to one or more external computers. The communicating interfaces 340*a*-340*z* can include, for example, one or more Ethernet interfaces, one or more parallel interfaces, one or more serial interfaces, one or more PCMCIA interfaces, and/or one or more wireless communication interfaces. The communication interfaces 340*a*-340*z* can be communicatively coupled to the system bus 370.

In one embodiment, a communication interface 340 can be capable of supplying the electric power to one or more peripheral devices via one or more dedicated wires, e.g., via a Power Over Ethernet (PoE) interface.

In a further aspect, a wireless communication interface of the EIR terminal 100 can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

The EIR terminal 100 can further comprise a keyboard interface 354 and a display adapter 355, both also coupled to the system/data bus 370. In one embodiment, the EIR reading terminal 100 can further comprise an audio input device, e.g., a microphone 379 and/or an audio output device, e.g., a speaker 381, to provide two-way voice communication of the EIR terminal operator with a remotely located person (e.g., a store manager). In one embodiment, the EIR terminal 100 can further comprise a power supply 383 provided, e.g., by an AC converter and/or a battery.

The components of the EIR terminal 100 can be incorporated into a variety of different housings including a portable housing and a housing which can be mounted on a fixed structure within a retail, manufacturing or storage facility.

Of course, devices that read bar codes, read RFID tags, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be referred to as an EIR terminal for purposes of this disclosure.

Figure 2:
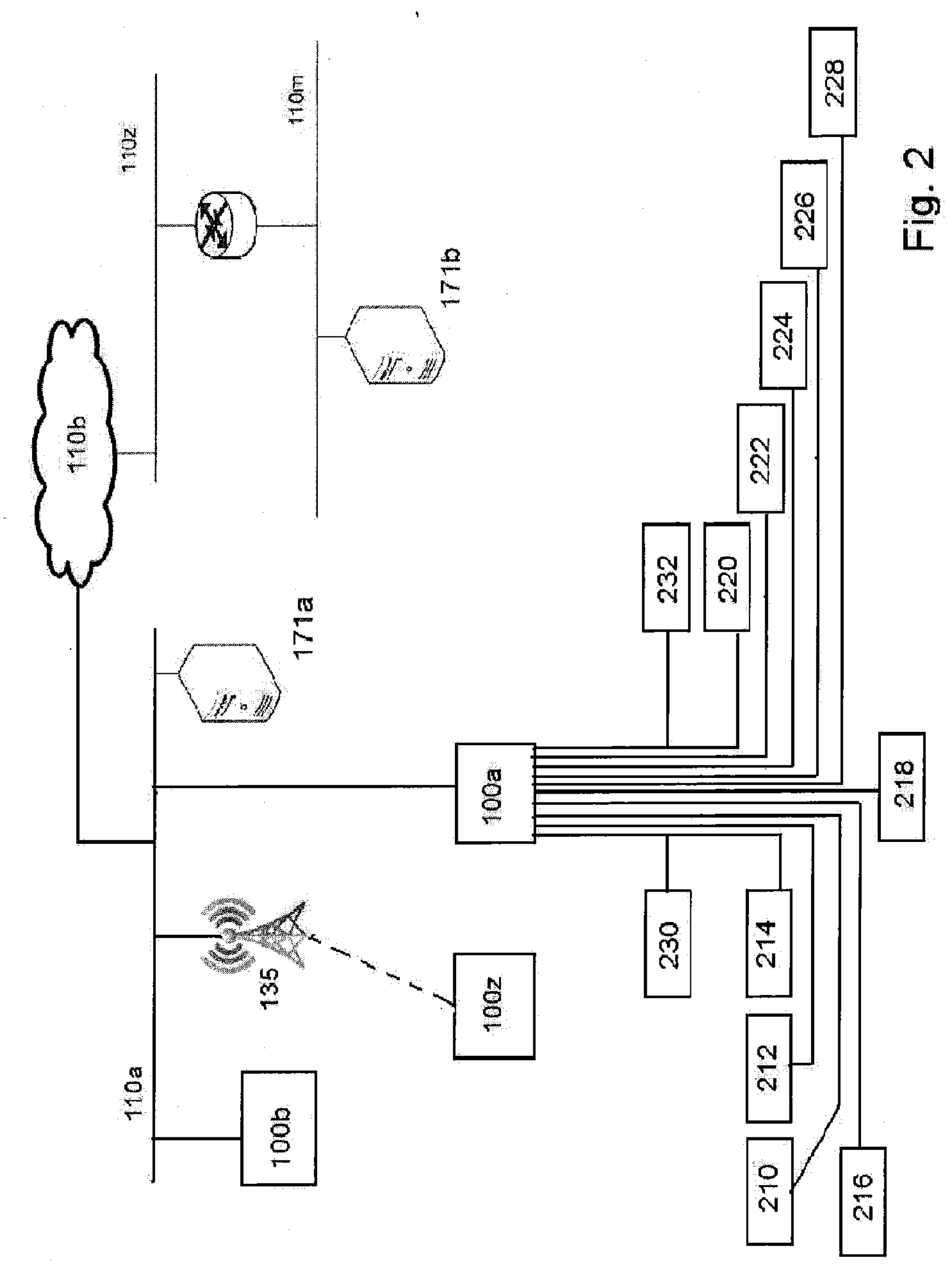
FIG. 2 depicts a network-level layout of a data collection system employing EIR terminals.

In a further aspect, the EIR terminal 100 can be configured for incorporation in a data collection system. The data collection system, schematically shown in FIG. 2, can include a plurality of EIR terminals 100*a*-100*z* in communication with a plurality of interconnected networks 110*a*-110*z*. In one embodiment, the EIR terminal 100 can be configured to communicate to an external computer 171. The external computer 171 can be provided, e.g., by a store server or a remote server. The EIR terminal 100 can be communicatively coupled to the network 110*a* which, in turn, can be communicatively coupled to one or more interconnected networks 110*b*-110*z*. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the network layer of the OSI model can comprise a plurality of lower layer networks, i.e., what can be regarded as a single Internet Protocol (IP) network, can include a plurality of different physical networks. While FIG. 2 does not show network routers, switches, firewalls, load balancers and other equipment necessary to enable network communications between the EIR terminal 100 and the external computer 171, a skilled artisan would appreciate the fact that various methods of interconnecting networks 110*a*-110*z* are within the scope of this disclosure.

In one embodiment, the external computer 171*a* can be reachable by the EIR terminal 100 via a local area network (LAN). In a yet another embodiment, the external computer 171*b* can be reachable by the EIR terminal 100*c* via a wide area network (WAN). A skilled artisan would appreciate the fact that other methods of providing interconnectivity between the EIR terminal 100 and the external computer 171 relying upon LANs, WANs, virtual private networks (VPNs), and/or other types of network are within the scope of this disclosure.

In another aspect, the plurality of networks 110*a*-110*z* can include at least one IEEE 802.11-conformant wireless network, and the EIR terminal 100*z* can connect a networks 110*a* via a wireless access point 135. In another aspect, an EIR terminal 100*a* can be in communication with at least one wireless device over Bluetooth™ wireless communication protocol. In a further aspect, the plurality of networks 110*a*-110*z* can include at least one GSM wireless network. In a further aspect, the plurality of networks 110*a*-110*z* can include at least one CDMA wireless network. In a further aspect, the plurality of networks 110*a*-110*z* can include at least one 3G wireless network, e.g., UMTS, HSUPA/HSDPA, or CDMA2000EvDO. In a further aspect, the plurality of networks 110*a*-110*z* can include at least one 4G wireless network, e.g., LTE, UWB, or IEEE 802.16m (WiMax). In a further aspect, the plurality of networks 110*a*-110*z* can include at least one Low Rate Wireless Personal Area Network (LR-WPAN), e.g., a IEEE 802.15 (Zigbee)-conformant wireless network. A skilled artisan would appreciate the fact that wireless networks implementing other wireless communication protocols are within the scope of this disclosure.

As noted herein supra, the EIR terminal 100 can be in communication with one or more peripheral devices, for example, a display 210, a cash register 212, an electronic payment terminal 214, a PIN entry keypad 216, a receipt printer 218, a weigh scale 220, a check reader 222, an electronic article surveillance (EAS) controller 224, a personal communication device (e.g., a two-way voice communication device) 226, a biometric identifier device 228, an object identification device 230, an encryption module, and an auxiliary EIR device 232. In a further aspect, EIR terminal 100 can control one or more above listed peripheral devices.

The EIR terminal can be further configured to route messages between one or more peripheral devices and an external computer 171 running a checkout application (e.g., a store server or a remote server). A message can include one or more message headers and a payload. In one embodiment, the EIR terminal 100 can route messages between a peripheral device and the external computer 171 without modifying the message payload. In another embodiment, the EIR terminal 100 can be configured to optimize network bandwidth usage by aggregating two or more messages received from one or more peripheral devices and forwarding the aggregated messages to the external computer 171. In a yet another embodiment, the EIR terminal 100 can aggregate two or more messages received from the external computer and forward the aggregated messages to a peripheral device. In a yet another embodiment, the EIR terminal 100 can broadcast a message received from the external computer 171 to two or more peripheral devices.

In a further aspect, communications between the EIR terminal 100 and the external computer 171 can comprise one or more HTTP requests and responses transmitted over one or more TCP connections. In one embodiment, communications between the EIR terminal 100 and the external computer 171 can comprise one or more SOAP messages transmitted over HTTP. A skilled artisan would appreciate the fact that using other transport and application level protocols is within the scope and the spirit of the invention.

In one embodiment, the EIR terminal 100 can further optimize communications between peripheral devices and the external computer by acting as an application-level protocol (e.g., HTTP protocol) proxy for one or more peripheral devices and/or for the external computer. In a further aspect, the HTTP response returned by the external server 171 and/or by a peripheral device can comprise one or more HTTP cache-control directives. For the purposes of this disclosure, "cache" can be defined as a storage and/or a method of storing HTTP response messages by a user agent (HTTP client) or by an HTTP proxy server. The effect of a cache is that the request/response chain is shortened if one of the participants along the chain has a cached response applicable to that request. A response is cacheable if a cache is allowed to store a copy of the response message for use in answering subsequent requests.

The components of EIR terminal 100 can be incorporated into a variety of different housings. One embodiment of EIR terminal 100 is shown in in FIGS. 3*a* (front panel view), 3*b* (side panel view), and 3*c* (bottom panel view). EIR terminal 100 can comprise housing 52 within which other components of EIR terminal 100 can be disposed. LCD screen display with touch screen sensor 554 can be disposed on the front panel 556. Also disposed on front panel 556 can be decode LED 558, scan led 59, and keyboard 64 including scan key 568 and navigation keys 72. Imaging window 74 can be disposed on the top panel of housing 52. Disposed on the side panel (best viewed in FIG. 3*b*) can be infra-red communication port 76, access door to a secure digital (SD) memory interface 78, audio jack 80, and hand strap 82. Disposed on the bottom panel (best viewed in FIG. 3*c*) can be multi-pin mechanical connector 84 and hand strap clip 86.

Figure 3B:
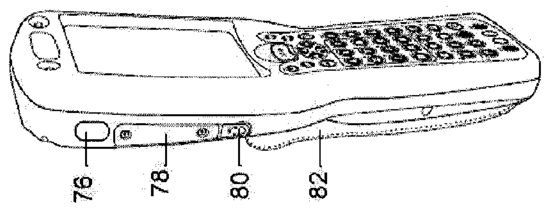
FIGS. 3*a*-3*c*, 4, and 5 schematically illustrate embodiments of the EIR terminal.
Figure 3C:
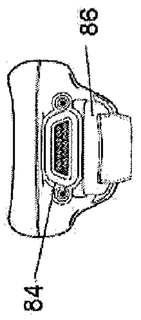
Figure 3A:
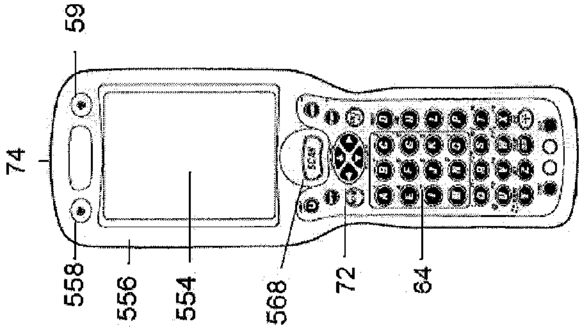
Figure 4:
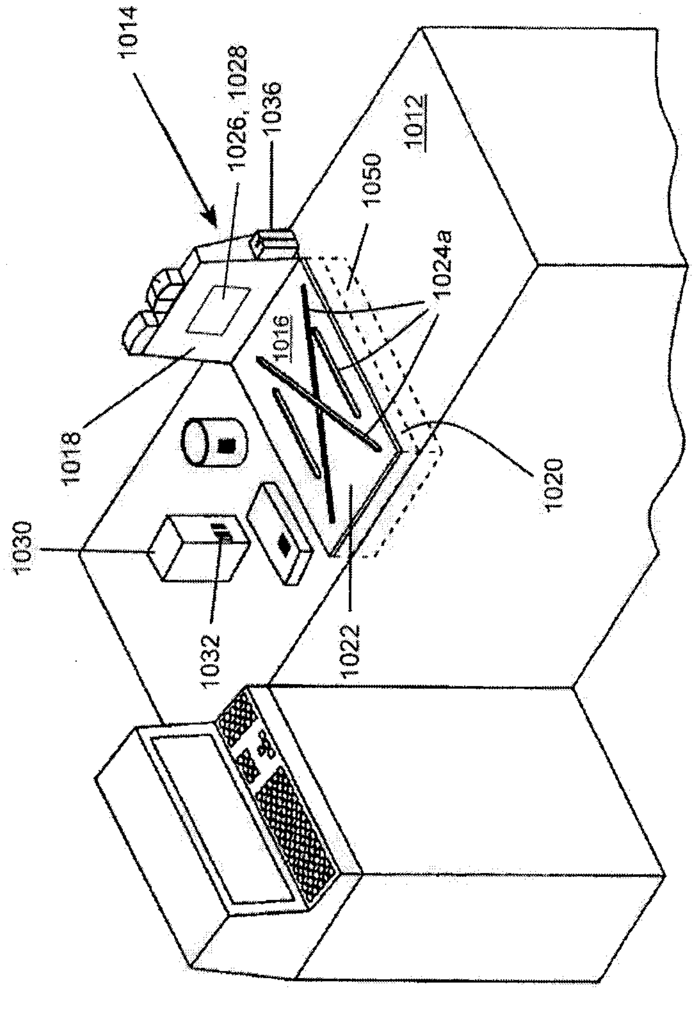

While FIGS. 3*a*-3*c* illustrate a hand held housing, a skilled artisan would appreciate the fact that other types and form factors of terminal housings are within the scope of this disclosure. For example, in one embodiment schematically shown in FIG. 4, an EIR terminal can be incorporated into a POS workstation with a presentation housing. The workstation 1010 can include a horizontal countertop 1012 for placement of products to be scanned. A bioptic scanner 1014 mounted within the countertop 1012 can include a first housing portion 1016 and a second housing portion 1018 which can project from one end of the first housing portion in a substantially orthogonal manner. In one embodiment, the first housing portion 1016 can comprise a laser-based indicia scanning terminal and the second housing portion 1018 can comprise an imager-based terminal. The countertop 1012 can include an optically transparent (e.g., glass) horizontal-scanning window 1020 mounted flush with the checkout counter, covered by an imaging window protection plate 1022 which can be provided with a pattern of apertures 1024*a*. The second housing portion 1018 can further include a vertical-scanning window 1026 behind which an imager-based indicia reading terminal 1028 can be housed. A skilled artisan would appreciate the fact that other ways of disposing the scanners and scanning windows are within the scope of this disclosure.

Figure 5:
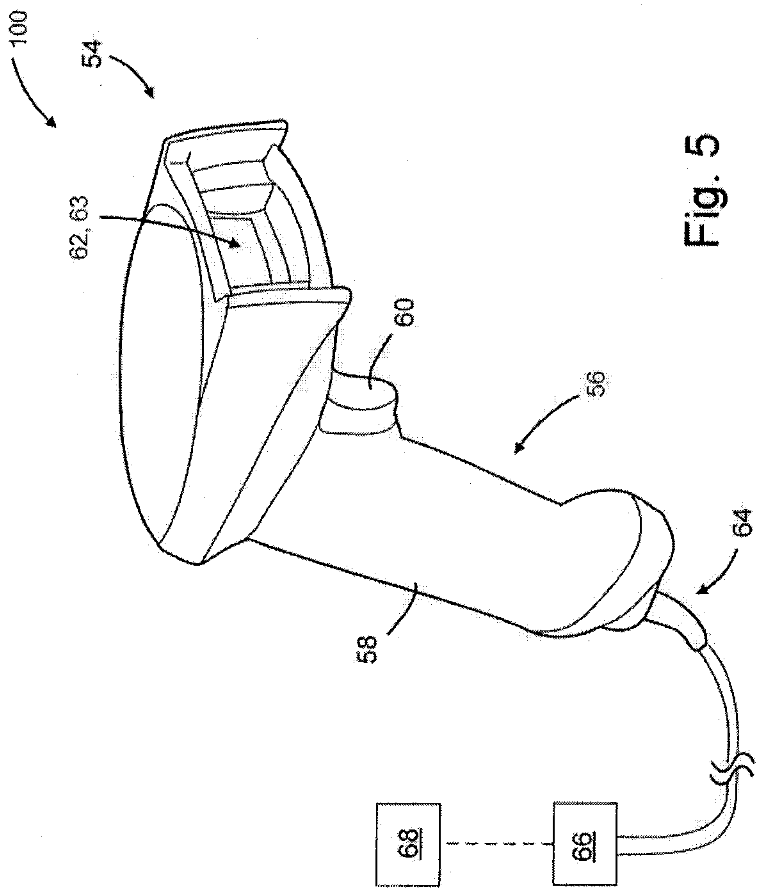

In another illustrative embodiment, shown in FIG. 5, there is provided an EIR terminal 100 including a housing 52 comprising a head portion 54 and a handle portion 56, the latter further comprising a hand grip 58 and a trigger 60. The trigger 60 can be used to initiate signals for activating frame readout and/or certain decoding processes. Other components of EIR terminal 100 can be disposed within the housing 52. For example, an image sensor 62 can be disposed in the head portion 54 behind a housing window 63. The image sensor 62 can be configured to output an electrical signal representative of light incident on the image sensor. EIR terminal 100 can further comprise one or more communication interfaces 66 which can be used to communicatively couple EIR terminal 100 to one or more peripheral devices as described in detail herein supra.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

An encoded information reading (EIR) terminal can comprise a processor, a memory, and at least one EIR device provided by a bar code reading device, an RFID reading device, an NFC reading device, or a magnetic card reading device. The EIR device can be configured to output raw message data containing an encoded message and/or output decoded message data corresponding to an encoded message. The EIR terminal can further comprise at least one communication interface, a display provided by a built-in display and/or an external display, and a user input device provided by a built-in keyboard and/or an external keyboard. The EIR terminal can be configured to transmit the raw message data and/or the decoded message data to an external computer. The EIR terminal can be further configured to communicate to one or more external peripheral devices. The EIR terminal can be further configured to route messages from the peripheral devices to an external computer and/or to route messages from the external computer to the peripheral devices. The EIR terminal can be further configured to aggregate two or more messages received from a peripheral device and forward an aggregated message to the external computer, and/or to aggregate two or more messages received from the external computer and forward an aggregated message to a peripheral device.

A small sample of systems methods and apparatus that are described herein is as follows:

A1. An encoded information reading (EIR) terminal comprising:

a processor;

a memory;

at least one EIR device selected from the group consisting of: a bar code reading device, an RFID reading device, an NFC reading device, and a magnetic card reading device, said EIR device configured to perform at least one of: outputting raw message data containing an encoded message and outputting decoded message data corresponding to an encoded message;

at least one communication interface;

a display provided by at least one of: a built-in display, an external display;

a user input device provided by at least one of: a built-in keyboard, an external keyboard;

wherein said EIR terminal is further configured to communicate to at least one external peripheral device;

wherein said EIR terminal is further configured to perform at least one of: routing messages from said at least one peripheral device to an external computer and routing messages from said external computer to said at least one peripheral device;

wherein said EIR terminal is further configured to perform at least one of: aggregating at least two messages received from said at least one peripheral device and forwarding an aggregated message to said external computer, aggregating at least two messages received from said external computer and forwarding an aggregated message to said at least one peripheral device.

A2. The EIR terminal of (A1), wherein said EIR terminal is configured to control said at least one peripheral device.

A3. The EIR terminal of (A1), wherein said at least one EIR device is provided by an RFID reading device and one of: a bar code reading device, an NFC reading device, and a magnetic card reading device.

A4. The EIR terminal of (A1), wherein said at least one peripheral device is selected from the group consisting of: a cash register, an electronic payment terminal, a PIN entry keypad, a printer, a weigh scale, a check reader, an electronic article surveillance (EAS) controller, a personal communication device, an imaging device, a biometric identifier device, an object identification device, an encryption module, and an auxiliary EIR device.

A5. The EIR terminal of (A1), wherein said EIR terminal is configured to communicate to said at least one peripheral device via a communication interface capable of delivering electric power to said at least one peripheral device.

A6. The EIR terminal of (A1), wherein said EIR terminal is configured to route at least one message between said at least one peripheral device and said external computer without modifying a payload of said at least one message.

A7. The EIR terminal of (A1), wherein said EIR terminal is further configured to display at least one message received from said external computer using at least one of: said built-in display, said external display.

A8. The EIR terminal of (A1), wherein said EIR terminal is further configured to transmit to said external computer at least one character received via said user input device.

A9. The EIR terminal of (A1), wherein said EIR terminal is configured to broadcast at least one message to two or more peripheral devices.

A10. The EIR terminal of (A1), wherein said EIR terminal is configured to act as an application-level protocol proxy for said at least one peripheral device.

A11. The EIR terminal of (A1), wherein said EIR terminal is configured to communicate to said at least one external computer using TCP/IP protocol.

A12. The EIR terminal of (A1), wherein said EIR terminal is configured to communicate to said at least one peripheral device over a wired communication interface selected from the group consisting of: an Ethernet interface, a parallel interface, a serial interface, a Thunderbolt interface, a USB interface, an optical media interface, and a PCMCIA interface.

A13. The EIR terminal of (A1), wherein said EIR terminal is configured to communicate to said at least one peripheral device over a wireless communication interface configured to support a communication protocol selected from the group consisting of: IEEE 802.1x, Bluetooth, GSM, GPRS, EDGE, HSPA, CDMA, EV-DO TDMA, and UMTS.

The invention claimed is:

1. An encoded information reading (EIR) terminal comprising:

a processor;

a memory;

at least one EIR device selected from the group consisting of: a bar code reading device, an RFID reading device, an NFC reading device, and a magnetic card reading device, said EIR device configured to perform at least one of: outputting raw message data containing an encoded message and outputting decoded message data corresponding to an encoded message;

at least one communication interface;

a display provided by at least one of: a built-in display, an external display;

a user input device provided by at least one of: a built-in keyboard, an external keyboard;

wherein said EIR terminal is further configured to communicate to at least one peripheral device, said at least one peripheral device being at least one external peripheral device;

wherein said EIR terminal is further configured to perform at least one of: routing messages from said at least one peripheral device to an external computer and routing messages from said external computer to said at least one peripheral device;

wherein said EIR terminal is further configured to perform at least one of: aggregating at least two messages received from said at least one peripheral device and forwarding an aggregated message to said external computer, aggregating at least two messages received from said external computer and forwarding an aggregated message to said at least one peripheral device.

2. The EIR terminal of claim 1, wherein said EIR terminal is configured to control said at least one peripheral device.

3. The EIR terminal of claim 1, wherein said at least one EIR device is provided by an RFID reading device and one of: a bar code reading device, an NFC reading device, and a magnetic card reading device.

4. The EIR terminal of claim 1, wherein said at least one peripheral device is selected from the group consisting of: a cash register, an electronic payment terminal, a PIN entry keypad, a printer, a weigh scale, a check reader, an electronic article surveillance (EAS) controller, a personal communication device, an imaging device, a biometric identifier device, an object identification device, an encryption module, and an auxiliary EIR device.

5. The EIR terminal of claim 1, wherein said EIR terminal is configured to communicate to said at least one peripheral device via a communication interface capable of delivering electric power to said at least one peripheral device.

6. The EIR terminal of claim 1, wherein said EIR terminal is configured to route at least one message between said at least one peripheral device and said external computer without modifying a payload of said at least one message.

7. The EIR terminal of claim 1, wherein said EIR terminal is further configured to display at least one message received from said external computer using at least one of: said built-in display, said external display.

8. The EIR terminal of claim 1, wherein said EIR terminal is further configured to transmit to said external computer at least one character received via said user input device.

9. The EIR terminal of claim 1, wherein said EIR terminal is configured to broadcast at least one message to two or more peripheral devices.

10. The EIR terminal of claim 1, wherein said EIR terminal is configured to act as an application-level protocol proxy for said at least one peripheral device.

11. The EIR terminal of claim 1, wherein said EIR terminal is configured to communicate to said at least one external computer using TCP/IP protocol.

12. The EIR terminal of claim 1, wherein said EIR terminal is configured to communicate to said at least one peripheral device over a wired communication interface selected from the group consisting of: an Ethernet interface, a parallel interface, a serial interface, a Thunderbolt interface, a USB interface, an optical media interface, and a PCMCIA interface.

13. The EIR terminal of claim 1, wherein said EIR terminal is configured to communicate to said at least one peripheral device over a wireless communication interface configured to support a communication protocol selected from the group consisting of: IEEE 802.1x, Bluetooth, GSM, GPRS, EDGE, HSPA, CDMA, EV-DO TDMA, and UMTS.

14. The EIR terminal of claim 1, wherein said at least one peripheral device is a cash register.

15. The EIR terminal of claim 1, wherein said at least one peripheral device is a printer.

16. The EIR terminal of claim 1, wherein said at least one peripheral device is an imaging device.

17. The EIR terminal of claim 1, wherein said user input device is provided by a built-in keypad, wherein said display is provided by a built-in display, and wherein said built-in keypad is spaced apart from said built-in display.

18. The EIR terminal of claim 1, wherein said EIR device is a bar code reading device.

19. The EIR terminal of claim 1, wherein said EIR device is an RFID reading device.

20. The EIR terminal of claim 1, wherein said EIR device is an NFC reading device.

* * * * *